United States Patent
Shin et al.

(10) Patent No.: US 8,699,577 B2
(45) Date of Patent: Apr. 15, 2014

(54) METHOD AND APPARATUS FOR INTERPOLATING IMAGE

(75) Inventors: Dong-hyuk Shin, Anyang-si (KR); Seung-hoon Han, Seoul (KR); Dae-hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1189 days.

(21) Appl. No.: 12/197,407

(22) Filed: Aug. 25, 2008

(65) Prior Publication Data

US 2009/0153733 A1 Jun. 18, 2009

(30) Foreign Application Priority Data

Dec. 13, 2007 (KR) .................. 10-2007-0129902

(51) Int. Cl.
*H04N 7/12* (2006.01)

(52) U.S. Cl.
USPC .................................... 375/240.17

(58) Field of Classification Search
USPC ....................... 375/240.01, 240.17
See application file for complete search history.

(56) References Cited

U.S. PATENT DOCUMENTS

| | | | | |
|---|---|---|---|---|
| 5,144,427 A * | 9/1992 | Kitaura et al. | ........... | 375/240.16 |
| 5,561,476 A * | 10/1996 | Kershaw et al. | ............. | 348/699 |
| 7,720,153 B2 * | 5/2010 | Sugimoto et al. | ........ | 375/240.16 |
| 8,144,778 B2 * | 3/2012 | Jia et al. | ................... | 375/240.16 |
| 2002/0097921 A1 * | 7/2002 | Wakisawa et al. | ............. | 382/300 |
| 2007/0133687 A1 * | 6/2007 | Wittmann et al. | ....... | 375/240.17 |

* cited by examiner

*Primary Examiner* — Dave Czekaj
*Assistant Examiner* — Tracy Li
(74) *Attorney, Agent, or Firm* — Sughrue Mion, PLLC

(57) ABSTRACT

Provided are a method and apparatus for interpolating an image, that improve frequency characteristics of a motion compensated interpolation by combining motion compensation and a de-blurring filter. The image interpolation method includes: estimating a motion vector between adjacent frames; determining a location of a pixel that is to be interpolated between adjacent frames based on the estimated motion vector; selecting values of candidate pixels of the location of the pixel that is to be interpolated; and filtering the values of the candidate pixels by applying each filter coefficient according to locations of pixels to the values of the candidate pixels.

13 Claims, 4 Drawing Sheets

METHOD AND APPARATUS FOR INTERPOLATING IMAGE

CROSS-REFERENCE TO RELATED PATENT APPLICATION

This application claims the benefit of Korean Patent Application No. 10-2007-0129902, filed on Dec. 13, 2007, in the Korean Intellectual Property Office, the disclosure of which is incorporated herein in its entirety by reference.

BACKGROUND OF THE INVENTION

1. Field of the Invention

The present invention relates to an apparatus for converting an image frame rate, and more particularly, to a method and apparatus for interpolating an image that improve frequency characteristics of a motion compensated interpolation by combining motion compensation and a de-blurring filter.

2. Description of the Related Art

Generally, personal computers (PCs) or high definition televisions (HDTVs) perform frame rate conversion in order to interchange programs according to various broadcasting signal specifications such as Phase Alternating Line (PAL) or National Television System Committee (NTSC). The frame rate conversion is for converting the number of frames that are output per second. In particular, a process for interpolating a new frame between frames is needed when a frame rate increases.

Most film image signals include 24 fps to show movies, whereas image signals include 30 fps according to an NTSC specification. Thus, film image signals must include 30 frames (or 60 field/sec) so as to apply them to an NTSC specification format.

FIG. 1 is a diagram for explaining a conventional frame rate converting method from a 24 fps digital image signal to a 30 fps digital image signal. Referring to FIG. 1, new frames F1' through F4' are generated by coping given frames F1 through F4. An interpolation frame Fi is generated by applying the given frames F2 and F3 to motion compensation having a certain rate. In more detail, a motion compensated frame by half a motion vector in a direction from the second frame F2 to the third frame F3 and a motion compensated frame by half a motion vector in a direction from the third frame F3 to the second frame F2. The combined frame is inserted into the interpolation frame F1 between the second frame F2 and the third frame F3.

In this regard, when sub-pixel motion estimation is used to interpolate an image or a frame, an interpolation area obtained by the motion compensation from a previous or next frame is slightly different from a substantial interpolation area.

In more detail, a pixel that is to be interpolated is obtained from a pixel of previous and next frames by dividing a motion vector value obtained by the motion estimation at a certain rate. The divided motion vector value is an integer value or a decimal value. If the motion vector value is not the integer value as shown in FIG. 2 that is a diagram for explaining a conventional image interpolation method, the pixel that is to be interpolated obtains, from the previous and next frames, a value containing a decimal point.

However, since a corresponding pixel is not substantially included in the previous and next frames at a location x of the motion vector that contains the decimal point, the interpolated pixel is obtained from four pixel values P1 through P4 around the location x of the motion vector by performing a well-known linear or non-linear operation.

However, the four pixels P1 through P4 correspond to values located in an integer part, and a sub-pixel value of the location x of the motion vector corresponds to a value located in a decimal part. Thus, an image detail difference occurs when the values located in the integer and decimal parts are compensated.

The conventional pixel interpolation method low-passes a frequency component of a pixel by performing the linear or non-linear operation, causing blurring. That is, an interpolation pixel according to the size of a motion vector and a motion compensation rate of previous and next frames may lose a high frequency component.

SUMMARY OF THE INVENTION

The present invention provides an image interpolation method that maintains constant frequency characteristics of an interpolation pixel irrespective of a location of a sub-pixel by combining motion compensation and a de-blurring filter in an image frame rate converting apparatus that uses sub-pixel motion estimation.

The present invention also provides an image interpolation apparatus that maintains constant frequency characteristics of an interpolation pixel irrespective of a location of a sub-pixel.

According to an aspect of the present invention, there is provided an image interpolation method comprising: estimating a motion vector between adjacent frames; determining a location of a pixel that is to be interpolated between adjacent frames based on the estimated motion vector; selecting values of candidate pixels of the location of the pixel that is to be interpolated; and filtering the values of the candidate pixels by applying each filter coefficient according to locations of pixels to the values of the candidate pixels.

According to another aspect of the present invention, there is provided a image interpolation apparatus comprising: a motion estimation unit estimating a motion vector that is to be applied to an interpolation frame by backward or forward matching a block between a previous frame and a next frame; a candidate pixel selection unit determining a location of a pixel that is to be interpolated between adjacent frames based on the motion vector estimated by the motion estimation unit, and selecting values of candidate pixels of the location of the pixel that is to be interpolated; a motion compensation filter bank unit storing each filter coefficient according to locations of pixels; and a motion compensation unit filtering the values of the candidate pixels selected by the candidate pixel selection unit by applying each filter coefficient according to locations of pixels thereto.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
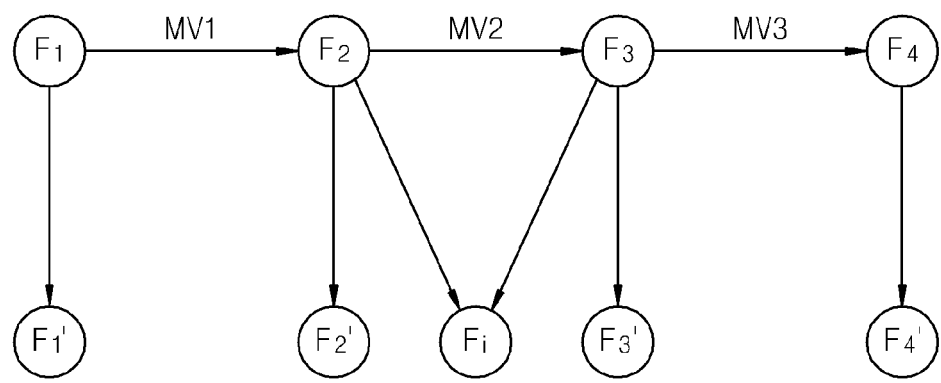
FIG. 1 is a diagram for explaining a conventional frame rate converting method from a 24 fps digital image signal to a 30 fps digital image signal.
Figure 2:
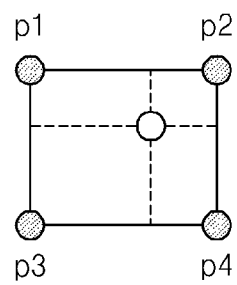
FIG. 2 is a diagram for explaining a conventional image interpolation method.
Figure 3:
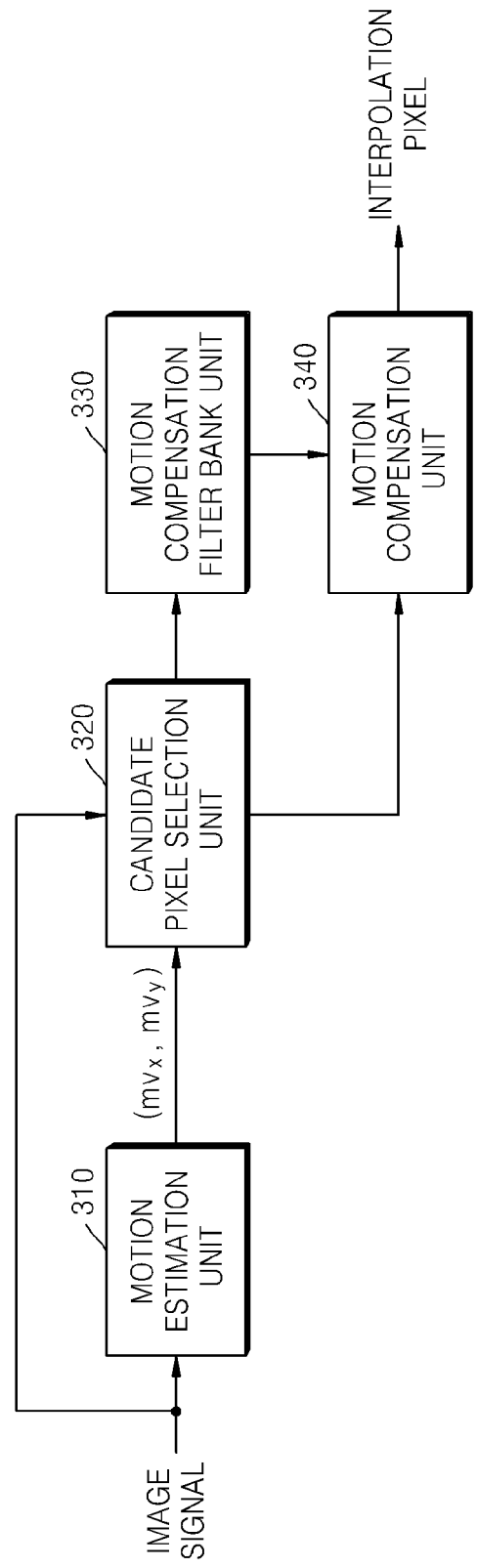
FIG. 3 is a block diagram of an image interpolation apparatus according to an embodiment of the present invention.

FIG. 3 is a block diagram of an image interpolation apparatus according to an embodiment of the present invention. Referring to FIG. 3, the image interpolation apparatus comprises a motion estimation unit 310, a candidate pixel selection unit 320, a motion compensation filter bank unit 330, and a motion compensation unit 340.

The motion estimation unit 310 estimates motion vectors $MV_x$ and $MV_y$ corresponding to each location of pixels that are to be interpolated between previous and next frames/fields by using the previous frame/field or the next frame/field. In this regard, a block matching algorithm (BMA) based on a sum of absolute differences (SAD) may be used to estimate the motion vectors $MV_x$ and $MV_y$. Each value of the motion vectors $MV_x$ and $MV_y$ is divided at a predetermined rate so as to determine each location of pixels that are to be interpolated between adjacent frames. Each divided value of the motion vectors $MV_x$ and $MV_y$ is an integer value or a decimal value.

The candidate pixel selection unit 320 determines each location of pixels that are to be interpolated between adjacent frames according to a certain rate of the motion vectors $MV_x$ and $MV_y$ that are estimated by the motion estimation unit 310, and selects values of candidate pixels adjacent to each location of pixels that are to be interpolated according to each location of pixels that are to be interpolated. For example, a candidate pixel at a location corresponding to an integer part of the motion vector MV is obtained from 9 pixels adjacent to a corresponding pixel, and a candidate pixel at a location corresponding to a decimal part of the motion vector MV is obtained from 16 pixels adjacent to the corresponding pixel.

The motion compensation filter bank unit 330 determines different filter bank values according to pixel locations, and selects filter coefficient values that are differently established according to each location of pixels that are determined by the candidate pixel selection unit 320. The filter bank values are filter coefficient values used to maintain constant frequency gain of an interpolation pixel. In this regard, a filter response corresponds to a value compensated with a sub-pixel.

The motion compensation unit 340 applies the filter coefficient values established by the motion compensation filter bank unit 330 to the values of candidate pixels selected by the candidate pixel selection unit 320.

The motion compensation unit 340 filters the values of candidate pixels by using a motion compensation filter bank to generate a frequency compensated interpolation pixel.

Figure 4:
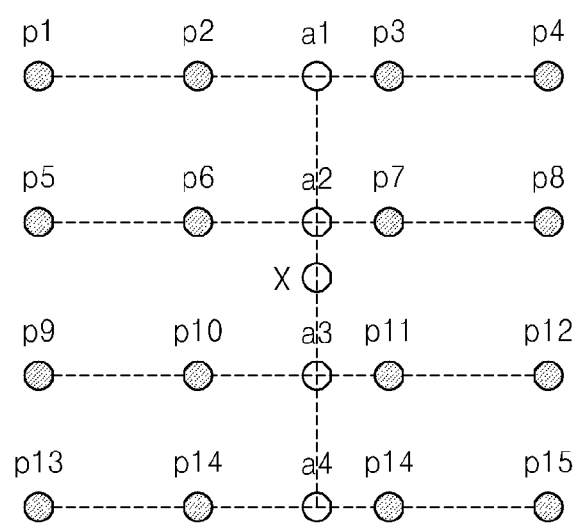
FIG. 4 illustrates pixel values corresponding to motion vectors that are extracted from a previous frame or a next frame according to an embodiment of the present invention.

FIG. 4 illustrates pixel values corresponding to motion vectors that are extracted from a previous frame or a next frame according to an embodiment of the present invention. Referring to FIG. 4, a value of a pixel that is to be interpolated is compensated using 9 and 16 values of adjacent pixels. Pixels p1 through p15 correspond to motion vectors having an integer value.

Sub-pixels a1 through a4 correspond to motion vectors having a decimal value.

A value of an interpolation pixel at a location P6 having the integer value is compensated by applying a predetermined filter coefficient to 9 adjacent pixels P1-P3, P5-P7, and P9-P11. A value of an interpolation pixel at a location X having the decimal value is compensated by applying a predetermined filter coefficient to 16 adjacent pixels P1-P16.

For example, the value of the interpolation pixel at the location X is expressed according to equation 1 below, $$P_i = \{C_1 \times P_1 + C_2 \times P_2 + C_3 \times P_3 + C_4 \times P_4 + \ldots + C_{16} \times P_{16}\} \quad (1)$$

wherein, filter coefficient values $C_1$ through $C_{16}$ are previously established as different values according to sub-pixels in order to maintain a constant frequency gain.

Figure 5:
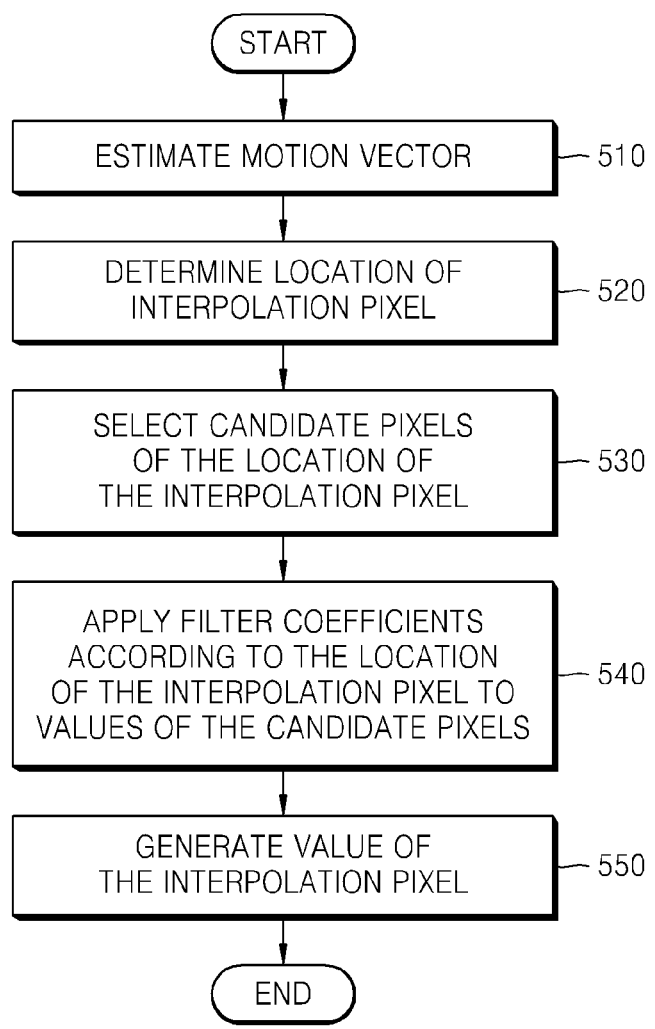
FIG. 5 is a flowchart illustrating an image interpolation method according to an embodiment of the present invention.

FIG. 5 is a flowchart illustrating an image interpolation method according to an embodiment of the present invention. Referring to FIG. 5, image signals of a previous frame and a next frame are continuously input.

Motion estimation blocks backward or forward match each other between the previous frame and the next frame to estimate motion vectors that are to be applied to an interpolation frame between both frames (operation 510).

Values of the estimated motion vectors are divided at a certain rate and are determined as locations of pixels that are to be interpolated between adjacent frames (operation 520). The values of the estimated motion vectors are divided at the certain rate according to a frame rate. The divided values of the motion vectors are motion information used to generate a pixel that is to be interpolated between pixels of the previous frame and the next frame. The divided values of the motion vectors are values containing an integer point or a decimal point.

Referring to FIG. 4, pixel values exist at the locations P1 through P6 corresponding to the motion vectors having the integer value within the previous frame and the next frame, whereas no pixel value exists at the location X corresponding to the motion vectors having the decimal value.

Thus, the adjacent pixels P1 through P15 are used to compensate for a pixel value at the location X corresponding to the motion vectors having the decimal value.

Thereafter, values of candidate pixels adjacent to a location of the pixel that is to be interpolated between pixels of the previous frame and the next frame are selected (operation 530).

Referring to FIG. 4, candidate pixels of the location P6 corresponding to the motion vector having the integer value are 9 adjacent pixels P1-P3, P5-P7, and P9-P11. Candidate pixels of the location X corresponding to the decimal part are 16 adjacent pixels P1-P16. The candidate pixels may use 9 through 16 adjacent pixel values.

The values of the candidate pixels of the interpolated pixel are filtered by using each filter coefficient according to locations of pixels (operation 540). In this regard, a filter response corresponds to a value compensated with a sub-pixel.

Referring to FIG. 4, if the locations P6, P7, P11, and X correspond to the motion vectors, a different filter bank is assigned according to locations of pixels that are to be interpolated. Filter coefficient values are established with respect to the filter banks used to maintain a constant frequency gain. For example, filter coefficients $A_1$ through $A_9$ are established at the location P6 to improve high frequency characteristics. Filter coefficients $B_1$ through $B_9$ are established at the location P7 to improve the high frequency characteristics. Filter coefficients $C_1$ through $C_9$ are established at the location P11 to improve the high frequency characteristics. Filter coefficients $D_1$ through $D_{16}$ are established at the location X to improve low and high frequency characteristics.

A value of the location P6 can be obtained by $\{A_1 \times P_1 + A_2 \times P_2 + A_3 \times P_3 + A_5 \times P_5 + A_6 \times P_6 + A_7 \times P_7 + A_9 \times P_9 + A_{10} \times P_{10} + A_{11} \times P_{11}\}$.

A value of the location X can be obtained by $\{D_1 \times P_1 + D_2 \times P_2 + D_3 \times P_3 + D_4 \times P_4 + \ldots + D_{16} \times P_{16}\}$.

Therefore, the values of the candidate pixels are filtered by using the predetermined filter banks and are generated as values of interpolation pixels having constant frequency characteristics (operation 550).

An integer pixel and a sub-pixel of an interpolated frame can maintain identical frequency characteristics.

In the present embodiment, base values used to compensate for a sub-pixel are increased to 16 so as to compensate constant frequency characteristics of a pixel value corresponding to an integer part of an interpolation pixel or a pixel value corresponding to a decimal part of the interpolation pixel, thereby removing an image artifact caused by conventional motion compensation interpolation of 4 base values. According to the present invention the other number of base values may be used as well.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, when an image is interpolated by using sub-pixel motion estimation, motion compensation and a de-blurring filter are combined, thereby maintaining constant frequency characteristics of an interpolation pixel irrespective of a location of a sub-pixel.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An image interpolation method comprising:
   estimating a motion vector between adjacent frames;
   determining a location of a pixel that is to be interpolated between adjacent frames based on the estimated motion vector;
   selecting candidate pixels adjacent to the location of the pixel in accordance with the location of the pixel that is to be interpolated; and
   filtering values of the candidate pixels by applying each filter coefficient according to locations of pixels to the values of the candidate pixels,
   wherein the determining of the location of the pixel comprises dividing a value of the motion vector at a certain rate and determining the location of the pixel that is to be interpolated based on the divided value of the motion vector, and
   wherein the number of the candidate pixels varies according to whether the divided value of the motion vector is an integer value or a decimal value.

2. The method of claim 1, wherein the values of the candidate pixels are values of at least 9 pixels adjacent to the location of the pixel that is to be interpolated within a previous frame or a next frame.

3. The method of claim 1, wherein the filtering of the values of the candidate pixels comprises establishing different filter coefficient values according to the location of the pixel that is to be interpolated.

4. The method of claim 1, wherein the filtering of the values of the candidate pixels further comprises establishing the filter coefficient values used to maintain a constant frequency gain of the pixel that is to be interpolated.

5. The method of claim 3, wherein the filtering of the values of the candidate pixels further comprises making a filtering response correspond to a value compensated with a sub-pixel.

6. The method of claim 1, wherein the filtering of the values of the candidate pixels further comprises maintaining constant frequency characteristics of an integer part of a pixel value corresponding to the location of the pixel that is to be interpolated or a decimal part of a pixel value corresponding to the location of the pixel that is to be interpolated.

7. The method of claim 1, wherein the estimating of the motion vector comprises estimating a motion vector in a sub-pixel unit.

8. An image interpolation apparatus comprising:
   a motion estimation unit estimating a motion vector that is to be applied to an interpolation frame by backward or forward matching a block between a previous frame and a next frame;
   a candidate pixel selection unit determining a location of a pixel that is to be interpolated between adjacent frames based on the motion vector estimated by the motion estimation unit, and selecting candidate pixels adjacent to the location of the pixel that is to be interpolated;
   a motion compensation filter bank unit storing each filter coefficient according to locations of pixels; and
   a motion compensation unit filtering values of the candidate pixels selected by the candidate pixel selection unit by applying each filter coefficient according to locations of pixels thereto,
   wherein the candidate pixel selection unit divides a value of the motion vector at a certain rate and determines the location of the pixel that is to be interpolated based on the divided value of the motion vector, and
   wherein the number of the candidate pixels varies according to whether the divided value of the motion vector is an integer value or a decimal value.

9. The apparatus of claim 8, wherein the motion compensation filter bank unit comprises different filter coefficients used to maintain a constant frequency gain of the pixel that is to be interpolated according to the location of the pixels that are to be interpolated.

10. A non-transitory computer readable recording medium having recorded thereon a program for executing the image interpolation method, the method comprising:
    estimating a motion vector between adjacent frames;
    determining a location of a pixel that is to be interpolated between adjacent frames based on the estimated motion vector;
    selecting candidate pixels adjacent to the location of the pixel that is to be interpolated; and
    filtering values of the candidate pixels by applying each filter coefficient according to locations of pixels to the values of the candidate pixels,
    wherein the determining of the location of the pixel comprises dividing a value of the motion vector at a certain rate and determining the location of the pixel that is to be interpolated based on the divided value of the motion vector, and wherein the number of the candidate pixels varies according to whether the divided value of the motion vector is an integer value or a decimal value.

11. The method of claim 2, wherein the values of the candidate pixels are values of 16 pixels adjacent to the location of the pixel that is to be interpolated within a previous frame or a next frame.

12. The method of claim 1, wherein the following equation is applied to determine the value of the pixel to be interpolated $$P_i = \{C_1 \times P_1 + C_2 \times P_2 + C_3 \times P_3 + C_4 \times P_4 + \ldots + C_{16} \times P_{16}\};$$

wherein the $P_i$ is the value of the pixel to be interpolated, the $C_1$-$C_{16}$ are the filter coefficients corresponding to each of the candidate pixels and the $P_1$-$P_{16}$ are the values of the candidate pixels.

13. The method of claim 1, wherein the following equation is applied to determine the value of the pixel to be interpolated $$P_i = \{C_1 \times P_1 + C_2 \times P_2 + C_3 \times P_3 + C_4 \times P_4 + \ldots + C_9 \times P_9\};$$

wherein the $P_i$ is the value of the pixel to be interpolated, the $C_1$-$C_9$ are the filter coefficients corresponding to each of the candidate pixels and the $P_1$-$P_9$ are the values of the candidate pixels.

* * * * *